March 27, 1956     A. E. LE VAN ET AL     2,739,480
INSTRUMENT CASE
Filed March 20, 1953
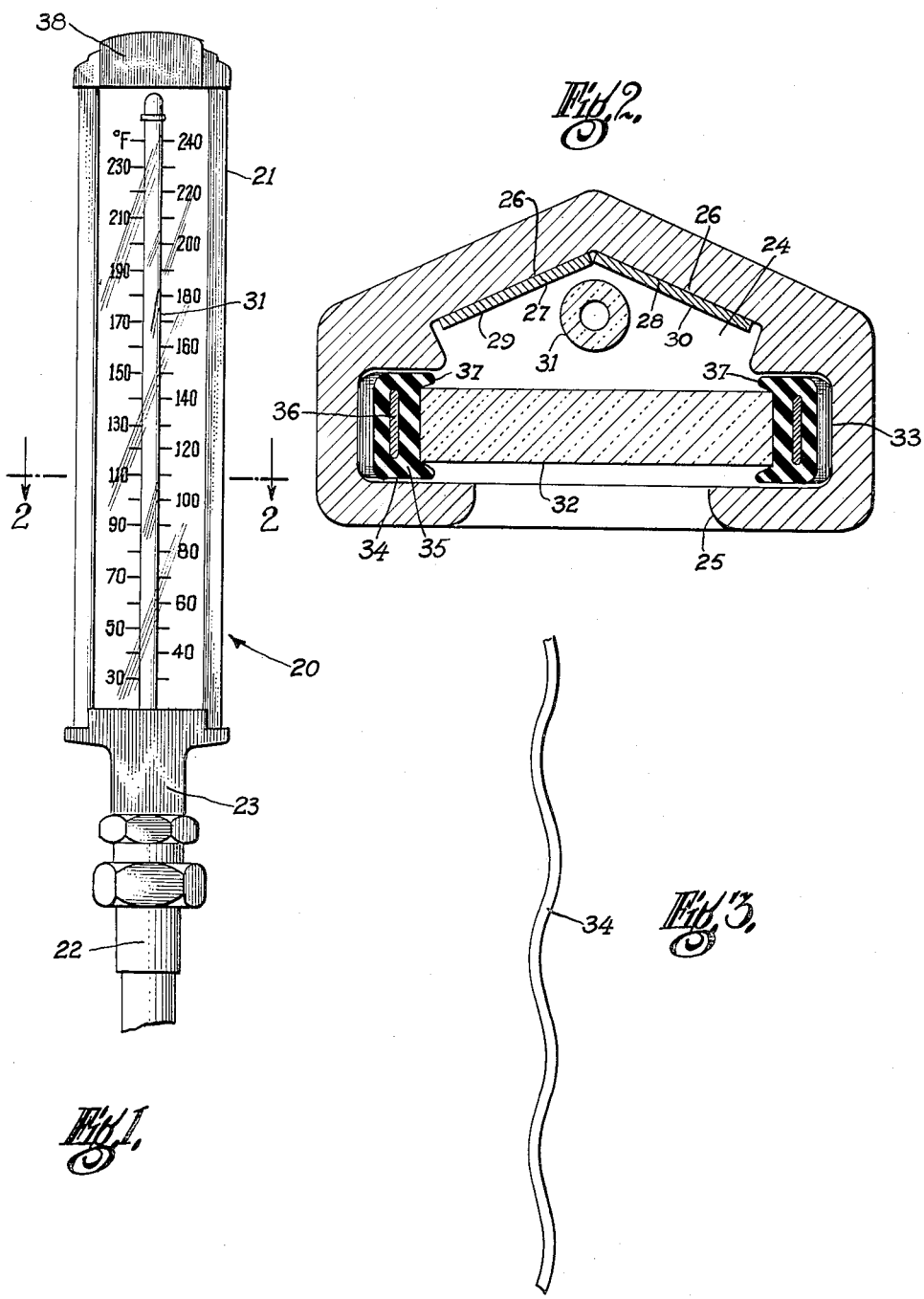
INVENTOR.
*Ambrose E. LeVan*
BY *Philip W. Harland*
*Pollard and Johnston*
ATTORNEYS United States Patent Office 2,739,480
Patented Mar. 27, 1956.

2,739,480
INSTRUMENT CASE

Ambrose E. Le Van and Philip W. Harland, Sellersville, Pa., assignors to American Machine and Metals, Inc., New York, N. Y., a corporation of Delaware Application March 20, 1953, Serial No. 343,626

2 Claims. (Cl. 73—374)

This invention relates to instruments and the like, and more particularly, to improved ring seals such as used around cover plates in instruments, such as thermometers, and the like.

One of the objects of this invention is to provide ring seals for cover plates, by which the allowable tolerances of the cover plate and the seat in which it is supported may be substantially larger than heretofore permitted without lessening the effectiveness of the member as a seal.

Another object of this invention is to provide an improved ring seal of simple and inexpensive construction; a ring seal which is formed to loosely mount cover plates in instruments and to provide easy assembly thereof; and a ring seal which mounts cover plates in such a manner that they are not subjected to severe vibration and jarring stresses.

By this invention, a resilient, wave-like ring seal is provided in an instrument for sealing the space between a cover plate, which closes an opening in the shell or casing of such instrument, and such shell or casing. The cover plate is transparent so that the instrument indicia can be read. The ring seal is formed with a member embedded therein, which is yieldable to permit expansion within appreciable limits of the wave-like ring seal under the compressing forces of a cover plate mounted in an instrument casing. In this way the instrument can easily accommodate cover plates which may be made with relatively loose tolerances. Moreover, the ring seal will maintain its effectiveness as a seal and will protect the cover plate against stresses due to jarring and vibration, regardless of the size of the cover plate within the limits allowed for each instrument.

These and other objects, features and advantages of this invention will become apparent from the following description of the accompanying drawings which are merely exemplary.

In the drawings:

Figure 1 is a front elevation of a thermometer embodying the present invention;

Figure 2 is an enlarged horizontal transverse cross section taken along line 2—2 of Figure 1; and Figure 3 is a diagrammatic view of the ring seal according to this invention.

Although the preferred embodiment of the invention is shown in the form of a thermometer, it is to be understood that the invention is equally applicable to other instruments. Referring now to the drawing, Figure 1 shows a thermometer, indicated generally at 20, having a casing or shell 21 attached to a socket 22 by a conventional connection 23. The shell is formed with a longitudinally extending recess 24, which extends inwardly and rearwardly from a front opening 25 and which has an inverted V-shaped bottom 26. Longitudinally extending plates 27 and 28 lie flat on opposing portions of the recess bottom 26, and are marked on their front confronting faces 29 and 30 to form a graduated scale as shown. An elongated tube 31 lies in front of the scale and extends in parallel spaced relation thereto. Tube 31 is connected with a bulb (not shown) in socket 22 in the usual manner, and serves as a container for temperature responsive fluid.

A transparent cover plate 32 overlies the scale and tube 31, and extends transversely across the forward portion of recess 24 to close the recess and to permit observation of the tube and scale therethrough. The marginal edges of the plate 32 are supported by a resilient ring seal 34 in an endless groove 33, which is formed around the recess 24 in the side walls thereof adjacent front opening 25.

As indicated in Figures 2 and 3, the ring seal is an elongated, undulated element, which has a body 35 of resilient, pliant material, preferably rubber, and which has a rigid, metal strip 36 embedded therein. The seal member may be formed by rolling a round metal wire to a flat condition, and then extruding the rubber body with the flat metal strip therein. Undulations then can be formed in the body and strip whereby said metal strip becomes a yieldable spring that will normally maintain the resilient pliant body wave-like and urge the body to return to its unstressed configuration whenever it is subjected to compression. The length of the undulations is preferably several times amplitude; for example, a ring seal having a peak to peak length of 1½ inches preferably has an amplitude of ¼ inch.

The inner face of the ring seal 34 may be formed at opposite ends with laterally protruding lips 37 between which the cover plate 32 is received. When the cover plate 32 is positioned in groove 33 and bears against the seal 34 in compressing relation thereto, the seal yieldingly confines the cover plate against lateral movement, and the lips 37 are forced against the side walls of groove 33 and at the same time clasp the cover plate fore and aft to prevent forward and rearward movement of the plate in the shell. Although forming no part of the present invention, the upper part 38 of the shell may be a removable cap, which permits assembly of the ring seal 34 and cover plate 32 in the shell.

By such construction, the allowable dimensions of the cover plate 32 and groove 33 may vary between substantially greater limits than was heretofore permitted in obtaining a seal that could withstand vibration and effectively seal the space between the cover plate and the shell. Such tolerances are afforded by the resilient seal which, by the normally undulated spring embedded therein, provides adequate supporting strength for cover plates of different sizes within appreciable limits. Such a seal resists the normal stresses encountered in the use of instruments, yet is flexible enough to yield under severe jarring and vibration of the instrument to avoid breakage. In addition to these advantages, the cost of an instrument constructed in accordance with this invention is relatively small, for the parts required are relatively few and inexpensive, and assembly of the parts is simple because the cover plate is loosely mounted in the instrument shell by the flexible seal.

It should be apparent that various details of construction can be changed without departing from the spirit of the invention as defined in the appended claims.

What is claimed is:

1. In an instrument or the like, a shell having a recess opening outwardly and forwardly, groove means formed in the side walls of the forward portion of said recess, a graduated scale in said recess, indicating means associated with said scale, a transparent cover plate set in the forward portion of said shell for closing said recess, said plate overlying said graduated scale and said indicating means so that these latter elements can be observed through said cover plate, and resilient wave-like seal means in said groove means and between said plate and said side walls fixing the plate forwardly, rearwardly and sidewise in the instrument, said seal means being wider than said cover plate so as to have marginal portions engaging the side walls of said groove means, said seal means being compressed between the peripheral edges of said cover plate and the side walls of said groove means to effect a seal between said side walls and said cover plate, said seal means having a yieldable spring member embedded therein urging said seal means to its unstressed configuration.

2. In an instrument or the like, a shell having a recess opening outwardly, groove means formed in the side walls of the forward portion of said recess, laterally expandable, wave-like seal means of resilient material in said groove means, said seal means having laterally protruding lips, and a cover plate mounted transversely in said recess to close said recess, said cover plate having its peripheral margins fitting between said lips to bear laterally against said seal means in compressing relation thereto so as to effect a seal between the cover plate and the shell, said lips clasping the fore and aft surfaces of said cover plate to confine said plate inwardly and outwardly, and said seal means having a yieldable spring member embedded therein urging said seal means to its unstressed configuration.

References Cited in the file of this patent

UNITED STATES PATENTS

| | | |
|---|---|---|
| 1,733,600 | Ileman | Oct. 29, 1929 |
| 1,924,555 | Hubbard | Aug. 29, 1933 |
| 2,058,165 | McCoy | Oct. 20, 1936 |
| 2,312,873 | Bruns | Mar. 2, 1943 |

FOREIGN PATENTS

| | | |
|---|---|---|
| 463,128 | Canada | Feb. 14, 1950 |